United States Patent [19]

Rupprecht

[11] Patent Number: 4,637,499

[45] Date of Patent: Jan. 20, 1987

[54] EXPANDER MECHANISM FOR AN INTERNAL SHOE DRUM BRAKE

[75] Inventor: Bernd Rupprecht, Edingen-Neckarhausen, Fed. Rep. of Germany

[73] Assignee: Deutsche Perrot-Bremse GmbH, Mannheim, Fed. Rep. of Germany

[21] Appl. No.: 777,338

[22] Filed: Sep. 18, 1985

[30] Foreign Application Priority Data

Sep. 21, 1984 [DE] Fed. Rep. of Germany ....... 3434736

[51] Int. Cl.⁴ .................. F16D 65/24; F16D 65/42
[52] U.S. Cl. ..................... 188/79.5 R; 188/217; 188/364
[58] Field of Search ............. 188/364, 363, 217, 72.8, 188/71.9, 325–343, 79.5, 196 R, 196 V, 196 M, 250, 72.4, 72.5, 72.6

[56] References Cited

U.S. PATENT DOCUMENTS

| | | | |
|---|---|---|---|
| 1,953,258 | 4/1934 | Pentz | 188/79.5 SS |
| 2,182,262 | 12/1939 | Pierce et al. | 188/79.5 S |
| 2,259,074 | 10/1941 | Main | 188/327 X |
| 3,035,666 | 5/1962 | Beeskow | 188/217 |
| 3,876,042 | 4/1975 | Borjesson | 188/217 X |
| 4,015,694 | 4/1977 | Danko et al. | 188/217 X |
| 4,055,238 | 10/1977 | Haraikawa et al. | 188/217 X |

FOREIGN PATENT DOCUMENTS

| | | | |
|---|---|---|---|
| 1148891 | 5/1963 | Fed. Rep. of Germany | 188/217 |
| 2001300 | 7/1983 | Fed. Rep. of Germany | . |
| 814872 | 12/1936 | France | 92/75 |

*Primary Examiner*—Douglas C. Butler
*Attorney, Agent, or Firm*—Holman & Stern

[57] ABSTRACT

An expanding mechanism for an interior shoe drum brake, such as a simplex "expander-wedge" type brake, comprises a cylinder housing affixed to a brake support, coaxially mounted pressure pistons slidable in the housing, expander members adjoining the respective pressure pistons and adjusting screws threaded into the pressure pistons which screws engage flange members of the respective brake shoes via interposed pressure pieces. To avoid local pressure peaks, the exterior ends of the adjusting screws are provided with part spherical indentations and the pressure pieces have complementary part spherical inner ends accommodated therein. The outer ends of the respective pressure pieces are connected to the respective flange members of the brake shoes by groove-type guides perpendicular to the axis of the brake drum.

2 Claims, 3 Drawing Figures

EXPANDER MECHANISM FOR AN INTERNAL SHOE DRUM BRAKE

BACKGROUND OF THE INVENTION

This invention relates to an expander mechanism for an internal shoe drum brake, particularly for a simplex "expanding-wedge" type brake having a cylinder housing affixed to a brake support, two coaxially mounted pressure pistons slidable in the housing, an expander member joining the pressure pistons, and respective adjusting screws threaded into the pressure pistons, the outer ends of which screws cooperate with flange members of the respective brake shoes, wherein the outer ends of the adjusting screws are each provided with an indentation which has a rounded shape in a cross section perpendicular to the axis of the brake drum, in which recess a pressure piece is inserted having a complementary shape, and which pressure piece, on the side facing away from adjusting screw is slidably connected with the flange member of the brake shoe via a groove in the pressure piece perpendicular to the axis of the brake drum.

In an expander mechanism of this general type, as shown, for example, in East German patent specification No. 2,001,200, the indentations in the exterior ends of the adjusting screws are generally hemicylindrical and the pressure piece is provided with a corresponding generally hemicylindrical configuration. Thus, the support surfaces of the pressure piece and the adjusting screws are cylindrical, with the axis of the cylinder being parallel to the axis of the brake drum. Each pressure piece is provided with a flange member on its side disposed away from the adjusting screw, which flange member engages an approximately radial groove in the flange member of the brake shoe which slidably presses against the base surface of the groove. As the brake lining progressively wears, the brake shoe moves downwardly with respect to the adjusting screw, whereby the plane abutting surface of the pressure piece slides in the groove in the flange member of the brake shoe, while at the same time the pressure piece swings in the hemicylindrical indentation in the associated adjusting screw. In this way, it is intended that for wear of the brake lining, the forces on the adjusting screws and the pressure pistons will act centrally, thus avoiding any torque moment on the adjusting screws and the pressure pistons. A disadvantage of this known expanding mechanism, however, is that in the case of radial expansion of the brake drum, accompanied by changes of alignment parallel to the drum axis, the edges of the pressure pieces are subject to compression and undesirable torques.

SUMMARY OF THE INVENTION

An object of the invention is to improve an expanding mechanism of the general type described, to enable the pressure pieces to perform swinging movement in all directions with respect to the associated adjusting screws.

The above object is achieved in accordance with the invention in that the indentations on the exterior ends of the adjusting screws have a part-spherical shape, and the pressure pieces have a complementary shape. This improvement enables the pressure piece to perform swinging movements in all directions with respect to its associated adjusting screw and thus enables it to follow relative movement parallel to the axis of the brake drum.

The pressure piece is preferably provided with a groove on its end facing away from the adjusting screw, which groove receives the flange member of the brake shoe.

Regarding efficiency considerations in assembling the expander mechanism, it is advantageous that the pressure piece be attached to the adjusting screw by means of a bent spring piece which form-lockingly embraces a flange on the adjusting screw.

Additional features and advantages of the invention will become apparent from the ensuing description and claims read in conjunction with the accompanying drawings.

DESCRIPTION OF PREFERRED EMBODIMENT

Figure 1:
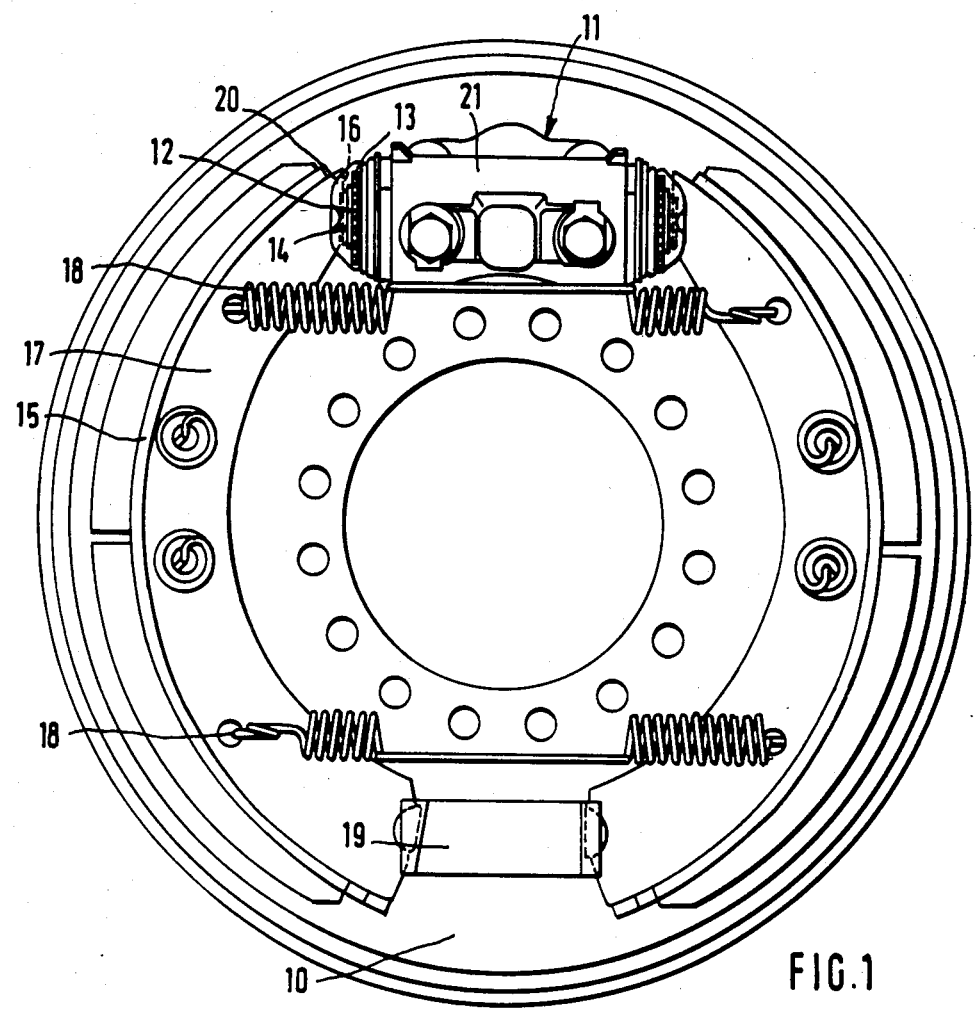
FIG. 1 is an elevational view of a simplex expander-wedge type brake in accordance with the invention.
Figures 2, 3:
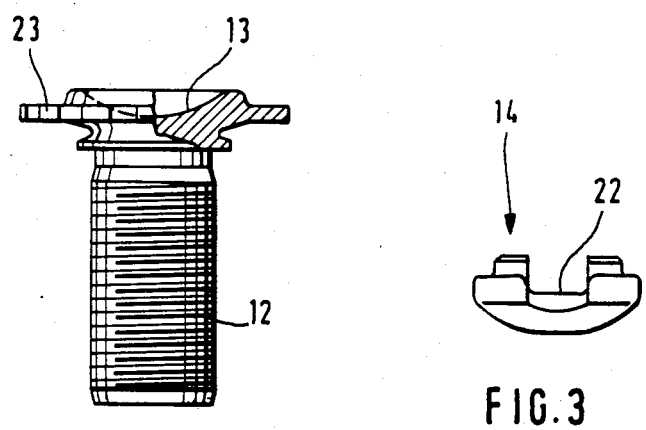
FIG. 2 is an enlarged partial cutaway view of an adjusting screw employed in the expander-wedge mechanism.
FIG. 3 is a side view of a pressure piece for use between a flange member of a brake shoe and the associated adjusting screw.

FIG. 1 is an illustration of a generally conventional simplex expander-wedge type brake. Two brake shoes 15 each have a brake shoe flange member 17 which is engaged by retracting springs 18. The lower support ends of the two brake shoe flange members 17 rest against a thrust member 19 which is attached to a brake support 10, and the corresponding two upper support ends of the flange members engage an "expander-wedge" mechanism 11.

The expander-wedge mechanism 11 comprises, in a manner which is known per se, a cylinder housing 21 attached to the brake support 10, in which housing two coaxial pressure pistons (not shown) are slidably mounted, the ends of which pistons respectively abut expander wedge gibs (also not shown). An adjusting screw 12 is threaded into the end of each piston, which screw has a toothed flange 23 adjacent its external end and a part spherical indentation 13 concentric therewith in its end face. A matching pressure piece 14 is inserted into the indentation 13 of each adjusting screw 12 and is attached to the screw by means of a bent spring piece 20. The pressure piece 14 has a linear groove 22 on its exterior end face, the base of which groove is planar. The bent spring piece 20 which clips onto the flange 23 of the adjusting screw 12 has an opening which exposes the groove 22 of the pressure piece 14, so that the flange member 17 of the associated brake shoe 15 can engage in the groove 22 of the pressure piece 14 through the bent spring piece 20. Since the end face of each brake shoe flange member 17 is linear, and the groove 22 in each of the pressure pieces 14 has a planar base, the contact between the base shoe flange member 17 and the pressure piece 14 is substantially face to face over the respective areas of the engaging elements. At the same time, there is also an area-covering locus of contact between the pressure piece 14 and the adjusting screw 12, namely between the complementary part spherical indentation 13 and the part spherical end of piece 14. When the expander-wedge mechanism 11 is actuated, the two adjusting screws 12 are moved outwards, which movement is transmitted to the flange members 17 of the brake shoes, via the pressure pieces 14. The flange members 17 of the brake shoes, which rest against the thrust member 19 of the brake support 10, are thus spread apart, in order to cause the brake linings disposed on the brake shoes 15 to press against the interior of the brake drum. When braking is completed, the two brake shoes 15, and thus the adjusting screws 12, are retracted into their original position, by the action of the retraction springs 18.

As the brake linings wear away, the end face 16 of each brake shoe flange member 17 moves down (FIG. 1) in the groove 22 of the pressure piece 14. At the same time, the pressure piece swings in the spherical indentation 13 of the adjusting screw 12, so that the end face 16 of the flange member 17 of the brake shoe continues to rest with its full surface against the base area of the groove 22 of the pressure piece 14.

In a departure from the exemplary embodiment illustrated, the pressure piece can alternatively be provided with a flange member, on the side of the pressure piece directed away from the adjusting screw, which flange member engages an approximately radial groove in the flange member 17 on the brake shoe.

While only a preferred embodiment of the invention has been described herein in detail, the invention is not limited thereby and modifications may be made within the scope of the attached claims.

I claim:

1. An interior shoe drum brake, comprising an expander mechanism affixed to a brake support, the expanding mechanism including opposed co-axial adjusting screws, and pressure pieces interposed between the exterior end surfaces of the respective screws and flange members of the respective brake shoes wherein the exterior end surfaces of the adjusting screws are provided with respective part-spherical inner ends of the pressure pieces, and wherein outer ends of the respective pressure pieces engage the flange members of the respective brake shoes via groove-type guide means perpendicular to the axis of the drum brake for providing wear-compensating relative movement between the brake shoes and the pressure pieces.

2. A brake according to claim 1 wherein the respective pressure pieces have grooves on the outer ends thereof defining the guide means which accommodate the flange members of the respective brake shoes.

* * * * *